US009589039B2

(12) United States Patent
Pathak et al.

(10) Patent No.: US 9,589,039 B2
(45) Date of Patent: Mar. 7, 2017

(54) SYNCHRONIZATION OF METADATA IN A MULTI-THREADED SYSTEM

(71) Applicants: Amit Pathak, Pune (IN); Aditya Kelkar, Pune (IN); Paresh Rathod, Pune (IN)

(72) Inventors: Amit Pathak, Pune (IN); Aditya Kelkar, Pune (IN); Paresh Rathod, Pune (IN)

(73) Assignee: Sybase, Inc., Dublin, CA (US)

(*) Notice: Subject to any disclaimer, the term of this patent is extended or adjusted under 35 U.S.C. 154(b) by 747 days.

(21) Appl. No.: 13/713,212

(22) Filed: Dec. 13, 2012

(65) Prior Publication Data

US 2014/0172790 A1    Jun. 19, 2014

(51) Int. Cl.
*G06F 17/30*    (2006.01)

(52) U.S. Cl.
CPC .............................. *G06F 17/30575* (2013.01)

(58) Field of Classification Search
CPC ......... G06F 17/30132; G06F 17/30575; G06F 11/2074; G06F 2201/82; G06F 17/3048; G06F 17/30008; G06F 17/30174; G06F 17/30578; G06F 17/30362; G06F 2201/825; G06F 17/30581; G06F 3/065; G06F 9/526; G06F 9/546; G06F 11/1662; G06F 9/466; G06F 11/1474; G06F 12/0269
USPC .................................. 707/613, 638, 704, 610
See application file for complete search history.

(56) References Cited

U.S. PATENT DOCUMENTS

| | | | | |
|---|---|---|---|---|
| 6,826,583 | B1* | 11/2004 | Flood | G06F 12/0269 |
| 7,383,389 | B1* | 6/2008 | Bumbulis | 711/130 |
| 2003/0167268 | A1* | 9/2003 | Kumar | G06F 17/30362 |
| 2005/0027943 | A1* | 2/2005 | Steere | G06F 12/121 |
| | | | | 711/133 |
| 2005/0289549 | A1* | 12/2005 | Cierniak | G06F 9/526 |
| | | | | 718/102 |
| 2006/0248131 | A1* | 11/2006 | Marwinski et al. | 707/206 |
| 2007/0198478 | A1* | 8/2007 | Yu | G06F 17/30566 |
| 2008/0072238 | A1* | 3/2008 | Monnie et al. | 719/310 |
| 2009/0240664 | A1* | 9/2009 | Dinker et al. | 707/3 |
| 2010/0023738 | A1* | 1/2010 | Sheehan | G06F 9/455 |
| | | | | 713/1 |

* cited by examiner

*Primary Examiner* — Evan Aspinwall
(74) *Attorney, Agent, or Firm* — Sterne, Kessler, Goldstein & Fox P.L.L.C.

(57) ABSTRACT

Synchronization of metadata structures in a multi-threaded system includes receiving, by a first thread of a processing device, a request for a metadata structure located in a first cache associated with an object, obtaining, by the first thread of the processing device, a synchronization mechanism associated with the first cache, holding, by the first thread of the processing device, the metadata structure associated with the object, receiving, by a second thread of the processing device, a request for the metadata structure in a second cache associated with the object, obtaining, by the second thread of the processing device, a synchronization mechanism associated with the second cache and informing the second thread of the processing device that the metadata structure associated with the object is not available.

32 Claims, 14 Drawing Sheets

```
GetMetadata(Params)
{
   Metadata = SearchMetadata(Params.LocalCache, Params);

If (!Metadata)
   {
        Metadata = AllocateMetadata(Params.FreePool)

If (Metadata)
        {
              InitializeMetadata(Params, Metadata);
              ACQUIRE_LOCK(Params.GlobalCache.Lock);
              Insert_Into_Cache(Params.LocalCache, Metadata);
              Insert_Into_Cache(Params.GlobalCache, Metadata);
              RELEASE_LOCK(Params.GlobalCache.Lock);
        }
        Else
        {
              Metadata = SearchMetadata(Params.GlobalCache.Lock,
                                                    Params);
        }
   }
   return Metadata;
}
```

FIG. 5A

```
SearchMetadata(Cache, Params)
{
    // Get the global lock for the Metadata cache
    ACQUIRE_LOCK(Params.GlobalCache.Lock);

// Search Metadata Cache to find a metadata structure meeting
    // the required search criteria
    For each Metadata structure in Cache
    {
        // Check if the metadata structure meets the search
        // criteria specified by the caller. For example,
        // exclusive access to the metadata structure is required,
        // the some of the metadata properties should match, etc.
        If (Check_Search_Criterion(Metadata, Params))
        {
            // Mark the metadata structure is in use. This
            // helps to determine if this metadata structure can
            // be used for various purposes like
            // A. Not allowing exclusive access to it
            // B. Not allowing the structure to be removed from
            //    the cache for purposes like using it for other
            //    object, tuning the caches etc.
            Mark_For_Use(Metadata);

// If the search is through global cache then the
            // metadata structure may currently belong to a
            // different object than requested so remove the
            // metadata structure from its current object local
            // cache and put it in the appropriate object local
            // cache.
            If (Cache == Params.GlobalCache)
            {
                Remove_From_Cache(Metadata.CurrentCache,
                                                 Metadata);
                Insert_Into_Cache(Params.LocalCache, Metadata);
            }

// If underlying basic algorithm requires some post
            // processing after acquiring the Metadata, it can be
            // done here. The post processing could include
            // maintain MRU-LRU list in the cache, cache statistic
            // updates, etc
            Post_Use_Operation(Params.LocalCache, Metadata);

Post_Use_Operation(Params.GlobalCache, Metadata);

break;
        }
    }
    // Release the global lock for Metadata
    RELEASE_LOCK(Params.GlobalCache.Lock);

// Return the found Metadata
    Return Metadata;
}
```

FIG. 5B

```
NewGetMetadata(Params)
{
    // First search the metadata in the local cache of the requested
    // object. Getting a metadata structure from there is useful as
    // it avoids initialization and instantiation cost for the
    // metadata structure.

Metadata = NewSearchMetadata (Params.LocalCache, Params);
    // If local cache does not have metadata which can be used for
    // this request then first try to allocate it from the free pool.
    // If the free pool is empty then get the metadata structure from
    // the global pool. Getting it from the global pool requires
    // removing the metadata structure from its current object local
    // cache, initializing it and putting it into the local cache of
    // the requested object.
    If (!Metadata)
    {
        Metadata = AllocateMetadata(Params.FreePool);
        If (Metadata)
        {
            // Initialize the newly allocated Metadata structure
            // with the information of the requested object
            InitializeMetadata(Params, Metadata);

// Reserve the Metadata structure so that after
            // installing it in the no other thread can use it
            // until it is the middle of being added to the
            // caches. Later, it is unreserved and made available
            // for general use.
            METADATA_RESERVE(Metadata);

ACQUIRE_LOCK(Params.LocalCache.Lock);
            Insert_Into_Cache(Params.LocalCache, Metadata);
            RELEASE_LOCK(Params.LocalCache.Lock);

ACQUIRE_LOCK(Params.GlobalCache.Lock);
            Insert_Into_Cache(Params.GlobalCache, Metadata);
            RELEASE_LOCK(Params.GlobalCache.Lock);

METADATA_UNRESERVE(Metadata);
        }
        Else
        {
            Metadata = NewSearchMetadata(Params.GlobalCache,
                                          Params);
        }
    }
    return Metadata;
}
```

FIG. 9A

```
NewSearchMetadata (Cache, Params)
{
    //Get the lock associated with the cache being searched
    ACQUIRE_LOCK(Cache.Lock);
// Search Metadata Cache to find a metadata structure meeting
// the required search criteria
    For each Metadata structure in Cache
    {
    // Decide to wait until hold succeeds based on the cache
    // being searched. (see search sequence in NewGetMetadata
    // to better understand this comment.)
    // A. It is better to wait while searching the requested
    //    objects local cache as getting a metadata from their
    //    avoids initialization cost. Note search in the local
    //     cache is done to find a metadata for that object.
    // B. While searching in the global cache for any unused
    //    metadata, the waiting may not be useful as search
    //    in the global cache is done to when NewGetMetadata
    //    does not find usable Metadata structure in its
    //    local cache of the requested object and searches
    //    the global cache to get an currently unused metadata
    //    structure (of some other object) which can be
    //    reused for the requested object.

wait_for_hold = (Cache == Params.LocalCache)

// Hold Metadata using CAS, the hold ensures that if a
    // concurrent thread accessing it through a different cache
    // does not operate on it in conflicting manner while the
    // Metadata structure is being worked on by this thread.
        if (!METADATA_HOLD(Metadata, wait_for_hold))
        {
            continue;
        }
        // If the metadata structure is reserved by another
thread
        // skip this one and move to the next metadata
structure
        // in the Cache
        If (IS_METADATA_RESERVED(Metadata)
        {
            METADATA_UNHOLD(Metadata);
            Continue;
        }
        // Use the metadata structure only if it fits in the
        // search criterion
        If (Check_Search_Criterion(Metadata,
Params.Criterion))
        {
            // Mark it for use by parent Mark_For_Use(Metadata);
```

FIG. 9B

```
// Since this thread is now going to use this
// metadata structure, the thread first reserves the
// metadata structure and then un-holds it.
// Un-holding ensures that if some other thread
// doing METADATA_HOLD operation with wait option then
// it gets unblocked the while loop in METADATA_HOLD.
// To disallow such thread from using this metadata
// structure, reserve is done first before un-hold.

METADATA_RESERVE(Metadata);
    METADATA_UNHOLD(Metadata);

// If the search is through global cache then the
// metadata structure may currently belong to a
// different object than requested so remove the
// metadata structure from its current object local
// cache and put it in the appropriate object local
// cache.
// Locking Note:
// Currently, this thread holds the lock on Cache
// (passed as parameter). Acquiring lock on a
// different cache while holding lock a cache can lead
// deadlocks between the concurrent threads. So
// followed is to hold lock for one cache at a moment.
// This also improves the concurrency as locks are
// held for shortest possible duration.
        If (Cache == Params.GlobalCache)
    {
        RELEASE_LOCK(Cache.Lock);

ACQUIRE_LOCK(Metadata.CurrentCache.Lock);
        Remove_From_Cache(Metadata.CurrentCache,
                                      Metadata);
        RELEASE_LOCK(Metadata.CurrentCache.Lock);
    // Initialize metadata structure with information
    // of the object it is going to be used for.

InitializeMetadata(Params, Metadata);

ACQUIRE_LOCK(Params.LocalCache.Lock);
        Insert_Into_Cache(Params.LocalCache,
Metadata);
        RELEASE_LOCK(Params.LocalCache.Lock);
    }
    else
    {
        RELEASE_LOCK(Cache.Lock);
    }
```

FIG. 9C

```
            // If underlying basic algorithm requires some post
            // processing after acquiring the Metadata, it can be
            // done here. The post processing could include
            // maintain MRU-LRU list in the cache, cache statistic
            // updates, etc ACQUIRE_LOCK(Params.LocalCache.Lock);
                Post_Use_Operation(Params.LocalCache, Metadata);
                RELEASE_LOCK(Params.LocalCache.Lock);

ACQUIRE_LOCK(Params.GlobalCache.Lock);
                Post_Use_Operation(Params.GlobalCache, Metadata);
                RELEASE_LOCK(Params.LocalCache.Lock);

// Now the metadata-structure is correctly installed
            // in all the caches. Un-reserve the metadata
            // structure so that other threads can use it.

METADATA_UNRESERVE(Metadata);
                Return Metadata;
            }
            else
            {
                // Metadata structure does not meet the search
                // criterion so un-hold it and move to next one METADATA_UNHOLD(Metadata);
            }
        }
// Could not find the metadata so release the acquired cache
// lock and return NULL.

RELEASE_LOCK(Cache.Lock);
    Return NULL;
}
```

FIG. 9D

SYNCHRONIZATION OF METADATA IN A MULTI-THREADED SYSTEM

BACKGROUND

Field

The present embodiments are generally related to synchronization of metadata structures in a multi-threaded system by using a plurality of synchronization mechanisms coupled with compare and swap (CAS).

Background Art

Conventional relational database management systems synchronize access to object metadata which is stored in a metadata cache. The metadata cache may include a local cache for each object and a global cache which provides navigation across all local caches The conventional systems utilize a single synchronization mechanism such as a spin-lock or mutex to protect the global cache and all local caches. If a task desires to operate on any of the local caches or the global cache, the task acquires the spinlock or mutex to gain exclusive access to the global cache and local caches. However, because of the single synchronization mechanism, it is not possible for multiple threads of a processor to concurrently operate. Thus, the single synchronization mechanism is a performance bottleneck in highly concurrent systems.

BRIEF SUMMARY

Multiple threads of a multi-thread system efficiently perform operations on metadata structures related to objects. In some embodiments, this is be done by utilizing a plurality of synchronization mechanisms coupled with compare and swap (CAS).

More particularly, and without limitation, system, method and computer program product embodiments for synchronization of metadata structures in a multi-threaded system are provided. In an embodiment, synchronization of metadata structures in a multi-threaded system includes receiving, by a first thread of a processing device, a request for a metadata structure located in a first cache associated with an object, obtaining, by the first thread of the processing device, a synchronization mechanism associated with the first cache, holding, by the first thread of the processing device, the metadata structure associated with the object, receiving, by a second thread of the processing device, a request for the metadata structure in a second cache associated with the object, obtaining, by the second thread of the processing device, a synchronization mechanism associated with the second cache, and informing the second thread of the processing device that the metadata structure associated with the object is not available.

Further features and advantages, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present invention and, together with the description, further serve to explain the principles of the invention and to enable a person skilled in the relevant art(s) to make and use the invention.

FIG. 5A illustrates example pseudocode for a GetMetadata method using a single synchronization mechanism.

FIG. 5B illustrates example pseudocode for a SearchMetadata method using a single synchronization mechanism.

FIG. 9A illustrates example pseudocode for a NewGetMetadata method using a plurality of synchronization mechanisms and CAS according to example embodiments.

FIGS. 9B-D collectively illustrate example pseudocode for a NewSearchMetadata method using a plurality of synchronization mechanisms and CAS according to example embodiments.

Figure 10:
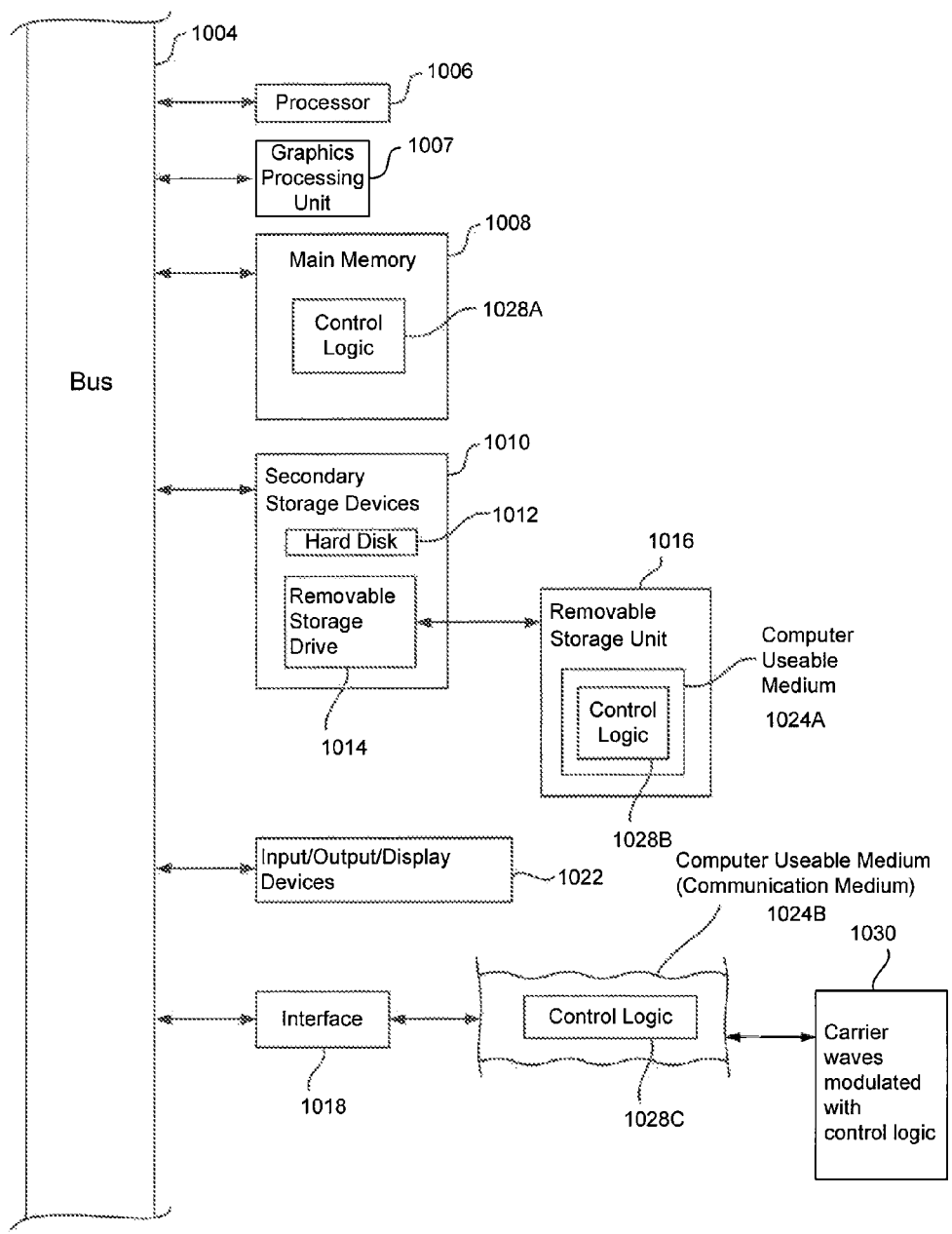

FIG. 10 illustrates an example computer system according to example embodiments.

Features and advantages of embodiments of the present invention will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION OF THE INVENTION

Introduction

The following detailed description refers to the accompanying drawings that illustrate exemplary embodiments consistent with this invention. Other embodiments are possible, and modifications can be made to the embodiments within the spirit and scope of the embodiments. Therefore, the detailed description is not meant to limit the embodiments. Rather, the scope of the embodiments is defined by the appended claims.

Metadata Management System

Figure 1:
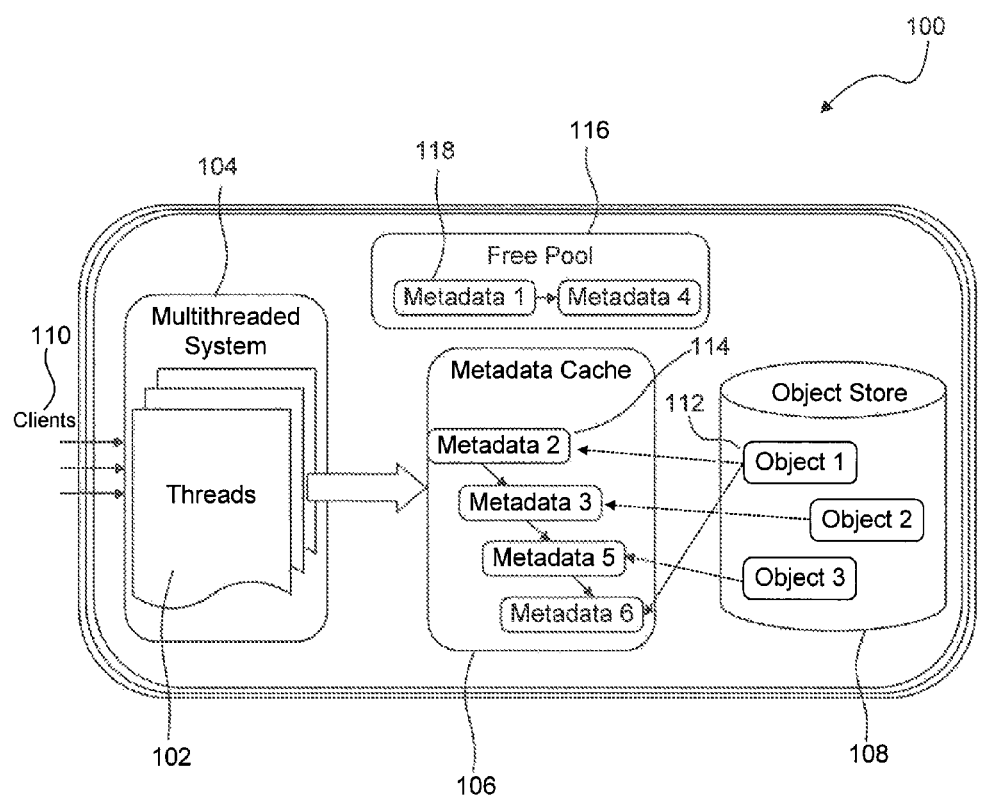
FIG. 1 illustrates a block diagram of a metadata management system according to example embodiments.

FIG. 1 shows a block diagram of a metadata management system 100 according to example embodiments. As shown in FIG. 1, a plurality of threads 102 in a multi-threaded system 104 share a metadata cache 106 which is in communication with an object store 108. As an example, the multi-threaded system 104 may be a database server such as Adaptive Server Enterprise which includes multiple engines.

According to example embodiments, the metadata management system 100 may be in communication with a plurality of software clients 110 which operate on a plurality of objects using the metadata management system 100. Each object 112 has corresponding metadata structures 114 that are associated with the object. An object may include but is not limited to a relational table, stored procedure, etc.

The metadata structures 114 are in-memory structures which store information that is related to the object to which the metadata structure is associated. Each of the metadata structures 114 store information associated with a single object at any given time. However, each metadata structure 114 may be utilized to store information associated with a different single object at a later point in time. As an example, the metadata structure 114 may be used to store a compiled plan for a stored database procedure as well as parameters that are passed by a client 110 or user for database procedure invocation. In addition, the metadata structure 114 may store a name of a client, a location of a client, a language of a client, etc. At a point in time, an object 112 may have multiple instantiated metadata structures 114 in the metadata management system 100. Multiple metadata structures 114 may be instantiated because concurrent threads may need exclusive access to a metadata structure associated with an object or because of a system/thread setting and requirement. As an example, a stored procedure may have different compiled plans that depend upon user settings of an execution thread, e.g. character set, isolation level, etc. If two different threads need different plans then multiple metadata structures need to be created; one for each separate plan.

In addition, as shown in FIG. 1, the metadata management system 100 may include a free pool 116 having a configured size. The metadata management system 100 maintains the free pool 116 which stores metadata structures. These metadata structures in the free pool 116 are available for use but are not yet initialized. However, before the metadata structures in the free pool 116 are used they are to be initialized with information of, an object. Thus, threads may allocate a free metadata structure 118 for an object from the free pool 116. Access to the free pool 116 by concurrent threads is synchronized using synchronization mechanisms such as a semaphore, a mutex, a spinlock, etc.

Initializing a metadata structure 118 for an object requires computational cost. The computational cost may include reading object information from disk/a network, processing read information, etc. Therefore, initializing a metadata structure 118 may be expensive due to disk input/output, network communication, other processing, etc. In order to avoid the cost of initializing a metadata structure 118, an initialized metadata structure 118 is cached in a metadata cache 106 after initialization. The metadata cache 106 provides quicker access to the metadata and a metadata structure 114 need not be initialized if stored in the metadata cache 106. However, as noted above, access to the metadata cache 106 by concurrent threads is to be synchronized using synchronization mechanisms such as a semaphore, a mutex, a spinlock, etc.

When the metadata management system 100 receives requests from clients 110 or users the metadata management system 100 operates on objects in the system. In order to operate on a particular object, the metadata management system 100 obtains access to a metadata structure associated with the particular object using the metadata cache 106 and then the metadata management system 100 operates on the object. As an example, if a client 110 requests to execute a stored procedure, a thread of the metadata management system 102 obtains a metadata structure associated with the stored procedure, and uses a compiled plan of the procedure in the metadata structure in order to execute the stored procedure.

Figure 2:
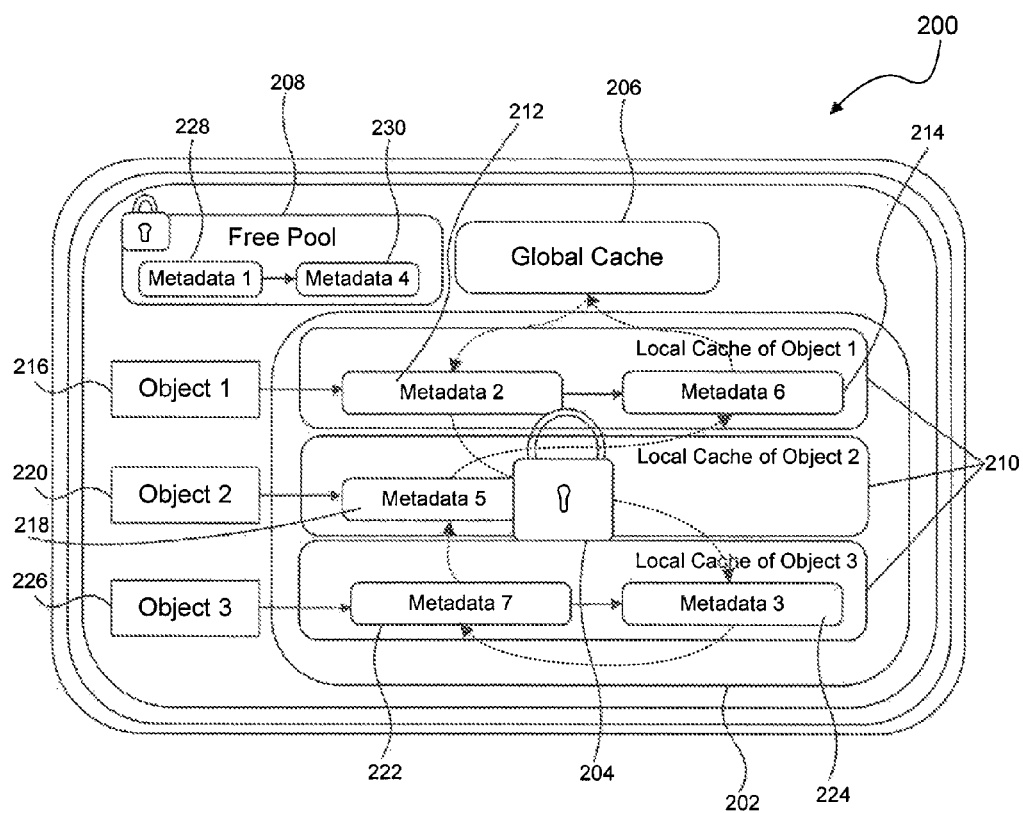
FIG. 2 illustrates a block, diagram of metadata structures in a metadata cache having a single synchronization mechanism.

According to example embodiments, requests for metadata structures 114 associated with objects by concurrent threads are served efficiently. According to example embodiments, the cost associated with reinitializing metadata structures 118 is avoided by using the metadata cache 106. According to example embodiments, if there is a metadata structure 114 in the metadata cache 106 for an object, then the metadata structure 114 in the metadata cache 106 is reused rather than initializing a new metadata structure 118. Thus, according to the example embodiments, multiple parallel threads may co-operate on the metadata cache 106.
Synchronization of Metadata Structures Using a Single Synchronization Mechanism FIG. 2 provides a diagram showing metadata structures and a single synchronization mechanism. A metadata management system 200 may include a metadata cache 202, a global cache 206, a single synchronization mechanism 204 and a free pool 208 having its own synchronization mechanism. A local cache 210 for each object stores metadata structures that are associated with an object. The metadata cache 202 includes the global cache 206 and the local cache 210 for each object. As an example, metadata structure 2 212 and metadata structure 6 214 are in the local cache of object 1 and associated with object 1 216, metadata structure 5 218 is in the local cache of object 2 and associated with object 2 220 and metadata structure 7 222 and metadata structure 3 224 are in the local cache of object 3 226. Each of these metadata structures is initialized and instantiated. However, metadata structure 1 228 and metadata structure 4 230 are in the free pool 208 available for use but having not yet been initialized. As shown in FIG. 2, a single synchronization mechanism 204 is used for the metadata cache 202 including global cache 206 and object local caches 210.

The metadata management system 200 may perform metadata eviction if there are no metadata structures available in the free pool 208 when a metadata request arrives. The metadata management system 200 will remove a metadata structure from an object local cache 210 of another object and reuse the evicted metadata structure for the requested object. The global cache 206 provides navigation over the metadata structures present in all' object local caches. The global cache navigation provides an efficient way to implement global cache eviction over all metadata structures in the metadata management system 200. Without the global cache navigation, eviction may be difficult. For instance, the without global cache navigation, eviction would require access to all object local caches to determine a candidate metadata structure to evict. Eviction of a least-recently-used cache from one of the object local caches may be implemented by ordering the metadata structures in the global cache based on their last use Thus, a single metadata structure may be selected for eviction over all object local caches by selecting the least recently used cache from the global cache, which is already ordered.

Thus, if a metadata structure is needed for an object, a thread first searches in a local cache 210 associated with the object, traverses each metadata structure in the local cache 210 and utilizes a corresponding metadata structure in the local cache 210 if there is one available for use However, if the corresponding metadata structure is not available in the local cache 210, then the object attempts to allocate a new metadata structure from the free pool 208. If the free pool 208 is empty then an unused metadata structure related to another object is chosen to discard using global cache navigation and reinitialized with information associated with the object. The new metadata structure is stored into the local cache associated with the object 210 as well as the global cache 206.

Thus, a copy of an allocated and initialized metadata structure will be present in both the global cache 206 and an object local cache 210. Multiple tasks could potentially operate in concurrence on an object local cache 210 and the global cache 206. A synchronization mechanism 204 is used to ensure that both the global cache 206 and object local cache 210 are consistent. A single synchronization mechanism 204 such as a semaphore, mutex, spinlock, etc. may be used to keep metadata structures consistent between the global cache 206 and multiple object local caches 210. Thus, any task that operates on any of the caches acquires the single synchronization mechanism 204 to gain exclusive access to all of the caches at once and only one thread may operate at a time.

Figure 3:
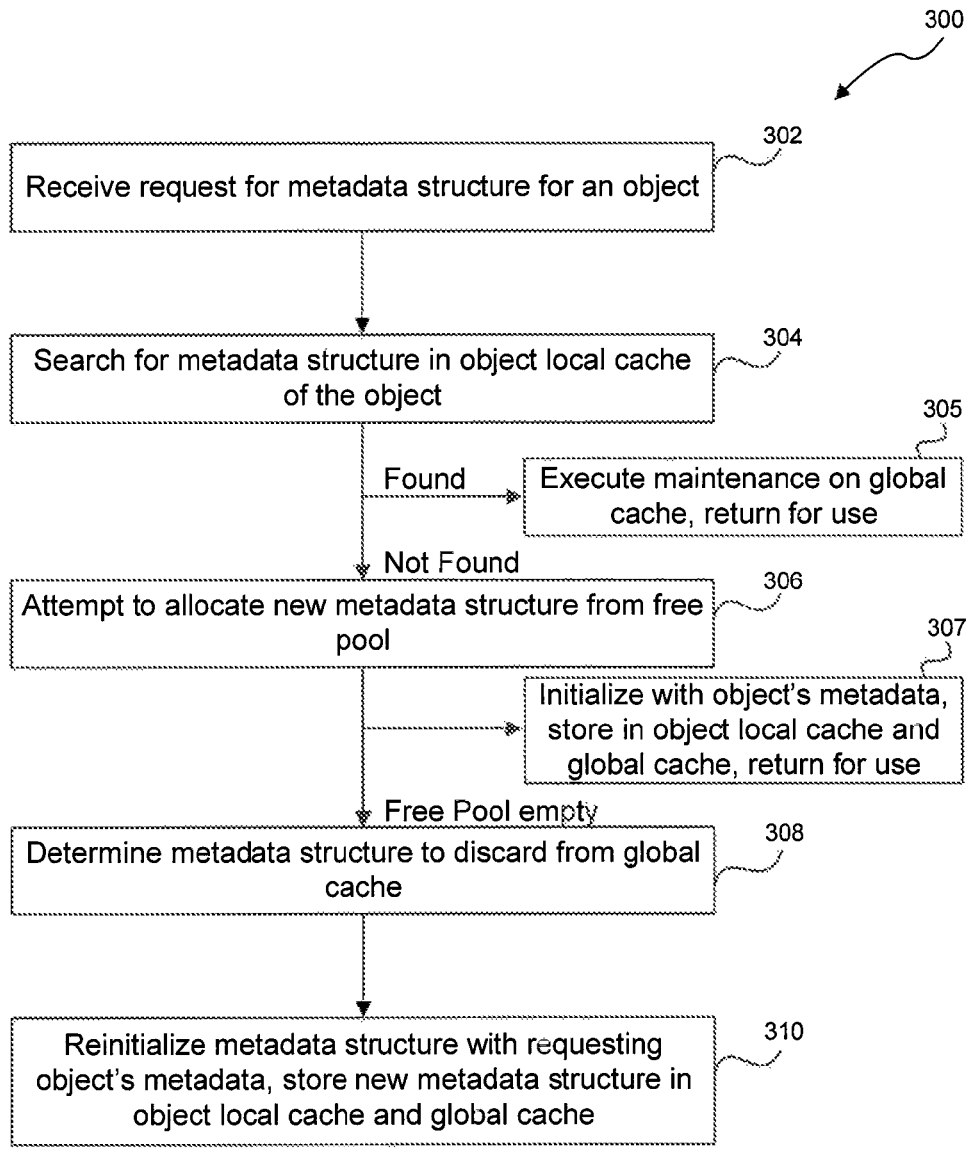
FIG. 3 illustrates a method of searching for a metadata stricture in a metadata cache having a single synchronization mechanism in a multi-threaded system.

FIG. 3 is a flowchart of a method 300 for searching for a metadata structure associated with an object in a metadata management system 200 having a metadata cache 202 including a global cache 206 and object local caches 210 as well as creation of a new metadata structure if necessary, according to an embodiment. The method makes use of a single synchronization mechanism 204. In step 302, a request for a metadata structure for an object is received by a thread of a processing device. In step 304, the thread of the processing device first searches in a local cache 210 associated with an object by traversing each metadata structure in the local cache 210 and utilizes a metadata structure in the local cache 210 if the thread finds the metadata structure in the local cache (step 305). If found, the metadata management system 200 executes maintenance on the global cache 206 by updating least-recently-used/most-recently-used caches in the global cache 206. This found metadata structure is then returned for use. However, if the metadata structure is not available in the local cache, then in step 306 the thread of the processing device attempts to allocate a new metadata structure from a free pool 208. If this allocation is successful, the new metadata structure is initialized with the object's metadata, stored in the local cache 210 and the global cache 206 and returned for use (step 307). However, if the free pool 208 is empty, then in step 308 the thread of the processing device determines a metadata structure to discard from the global cache 206, and discards the metadata structure in the global cache 206. In step 310, the thread of the processing device reinitializes the discarded metadata structure with the requesting object's metadata, and stores the new metadata structure in the local cache 210 and global cache 206.

Figure 4:
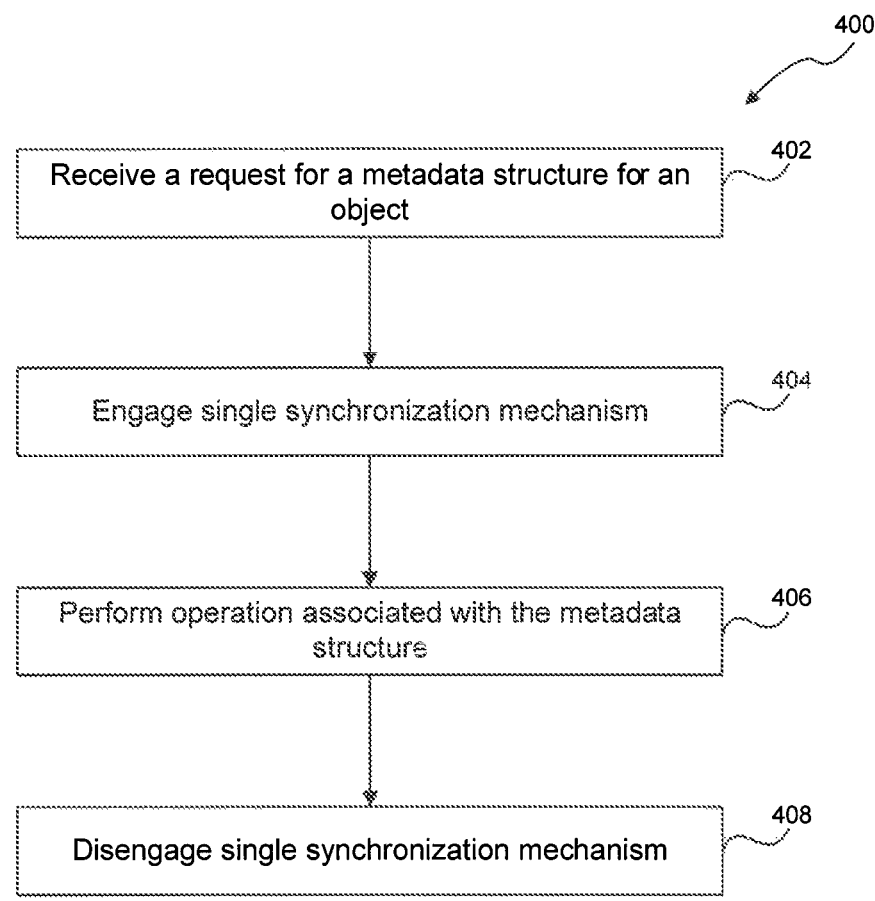
FIG. 4 illustrates a method of engaging and disengaging a single synchronization mechanism in a metadata cache, in a multi-threaded system.

FIG. 4 is a flowchart of a method 400 for engaging or obtaining a single synchronization mechanism 204 associated with a metadata management system 200 having metadata cache 202 including a global cache 206 and object local caches 210, according to an embodiment. In step 402, a request for a metadata structure for an object is received by a thread of a processing device. In step 404, the thread of the processing device engages the single synchronization mechanism 204 thereby restricting all other threads of the processing device from operating on any of the global cache 206 and object local caches 210. In step 406, the thread of the processing device performs an operation associated with the request for the metadata structure. In step 408, the thread of the processing device disengages the single synchronization mechanism 204 thereby allowing all threads of the processing device to operate on any of the global cache 206 and object local caches 210.

FIGS. 5A and 5B show example pseudocode associated with utilizing a single synchronization mechanism 204 with a global cache 206 and object local caches 210. FIG. 5a provides example pseudocode of a method "GetMetadata" shown in FIG. 4. FIG. 5b provides example pseudocode of a method "SearchMetadata" shown in FIG. 3.

More particularly, FIG. 5A shows example pseudocode for a "GetMetadata" method taking "Params" as an input parameter. First, the method attempts to find the desired metadata in a local cache. If the metadata is found in one of the local caches it is returned. However, if the metadata is not in the local cache then the metadata may be allocated using the free pool. If allocation of metadata in the free pool is successful then the metadata is initialized. The synchronization mechanism is acquired, the metadata is inserted in the local cache, then the metadata is inserted into the global cache and the synchronization mechanism is deacquired or released. However, if the free pool is empty then a search of the global cache occurs. Finally, after the search of the global cache occurs, the "GetMetadata" returns metadata.

FIG. 5B shows example pseudocode for a "SearchMetadata" taking "Cache" and "Params" as input parameters. First, the synchronization mechanism is acquired. Then, for each metadata structure in the cache being searched, the method determines whether there is a metadata structure that matches the search criteria "Params." If the search criterion matches, then metadata structure is marked for use and will eventually be returned. If the cache being searched is the global cache, then the metadata structure is removed from the current object local cache and inserted into another object local cache. In other words, the metadata structure is being evicted for use by another object. Any post processing regarding the metadata may then occur. For instance, this may include maintaining MRU/LRU lists or statistics regarding the caches. Then the synchronization mechanism is deacquired or released and the metadata is returned.

Synchronization of Metadata Structures Using a Plurality of Synchronization Mechanisms Coupled with CAS According to example embodiments, a plurality of synchronization mechanisms may be utilized in order to provide concurrent access to the caches. Thus, multiple threads of a metadata management system may operate concurrently on the global cache and object local caches. According to example embodiments, each cache (global and object local) may include a separate semaphore, mutex or spinlock, etc. Therefore, two tasks may not obtain access to a single metadata structure, but more than one task may operate on different metadata structures at a time. However, because a metadata structure is stored in both the global cache and an object local cache, it is possible that the metadata structure may be concurrently accessed by two tasks; one task using the global cache and another task using the local cache. Thus, thread safety requires more than a synchronization mechanism on each cache. Metadata structure consistency may be provided by coupling the plurality of synchronization mechanisms with compare and swap (CAS) to provide thread-safe access to the metadata structures.

Figure 6:
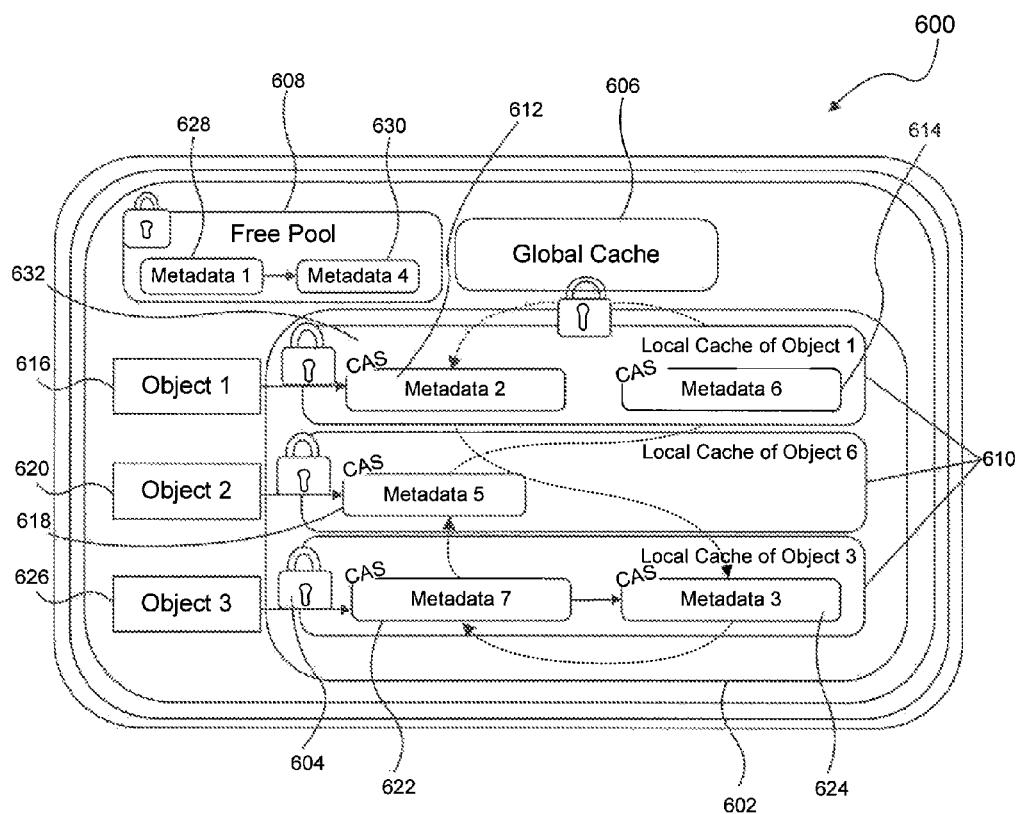
FIG. 6 illustrates a block diagram showing metadata structures in a metadata cache having a plurality of synchronization mechanisms according to example embodiments.

FIG. 6 provides a block diagram showing metadata structures and a plurality of synchronization mechanisms coupled with CAS, according, to an embodiment. According to example embodiments, a metadata management system 600 may include a metadata cache 602, a plurality of synchronization mechanisms 604, a global cache 606 and a free pool 608 having its own synchronization mechanism. A local cache 610 for each object stores metadata structures that are associated with an object. The metadata cache 602 includes the global cache 606 and the local cache 610 for each object. As an example, metadata structure 2 612 and metadata structure 6 614 are in the local cache of object 1 and associated with object 1 616, metadata structure 5 618 is in the local cache of object 2 and associated with object 2 620, and metadata structure 7 622 and metadata structure 3 624 are in the local cache of object 3 626. Each of these metadata structures is initialized and instantiated. However, metadata structure 1 628 and metadata structure 4 630 are in the free pool 608 having not yet been initialized. As shown in FIG. 6, a plurality of synchronization mechanisms are used for metadata cache 602 including the global cache 606 and object local caches 610, each having a respective synchronization mechanism 604. In addition, each respective synchronization mechanism 604 in the metadata cache 602 is coupled with CAS 632 thereby providing thread-safe access to the metadata structures as further described below.

According to example embodiments, by providing a separate synchronization mechanism 604 for each cache, multiple threads may operate on different caches in the metadata cache 602 concurrently by acquiring the synchronization mechanism 604 that corresponds to a particular cache. However, as noted above, a metadata structure is in both an object local cache 610 and a global cache 606. Access to a metadata structure needs further synchronization to ensure thread safety by using hardware supported CAS 632. CAS 632 are atomic instructions that compare contents of a memory location to a given value. If the contents of the memory location match the given value then the contents of memory location may be modified to a new given value.

CAS-Based Synchronization

According to example embodiments, CAS-based synchronization 632 may include one or more of the following operations: (1) METADATA_HOLD, (2) METADATA_UNHOLD, (3) METADATA_RESERVE, (4) METADATA_UNRESERVE and (5) IS_METADATA_RESERVED. It is noted that embodiments of the invention are not limited to these examples.

METADATA_HOLD is used to hold a metadata structure for a thread. Thus only a single concurrent thread may hold metadata for an object. If a metadata structure is held by a thread then only that thread may operate on the metadata for the object.

METADATA_UNHOLD allows a thread which is holding a metadata structure to unhold the metadata structure so that other threads may use the metadata structure.

Example pseudocode for METADATA_HOLD and METADATA_UNHOLD is provided below.

```
METADATA_HOLD(Metadata, Wait)
{
    if (Wait)
    {
        while(CAS(Metadata.hold_flag, 0, 1));
        return TRUE;
    }
    else
    {
        return CAS(Metadata.hold_flag, 0, 1};
    }
}
METADATA_UNHOLD(Metadata)
{
    CAS(Metadata.hold_flag, 1, 0);
}
```

METADATA_RESERVE provides modification rights for a metadata structure. Modification rights may include initialization of a metadata structure and installation of the metadata structure in a cache, or moving a metadata structure from one local cache of an object to another local cache of an object. This METADATA_RESERVE operation indicates to concurrent threads that a metadata structure is being initialized/installed and that another thread should not use the metadata structure.

METADATA_UNRESERVE allows a thread which has reserved a metadata structure to unreserve the metadata structure so that other threads may use the metadata structure.

IS_METADATA_RESERVED allows a thread to check if a metadata structure is currently reserved by another thread.

Example pseudocode for each of METADATA_RESERVE, METADATA_UNRESERVE and IS_METADATA_RESERVED is provided below.

```
METADATA_RESERVE(Metadata)
{
    Metadata.reserve_flag = TRUE;
}
METADATA_UNRESERVE(Metadata)
{
    Metadata.reserve_flag = FALSE;
}
IS_METADATA_RESERVED(Metadata)
{
    return Metadata.reserve_flag;
}
```

Figure 7:
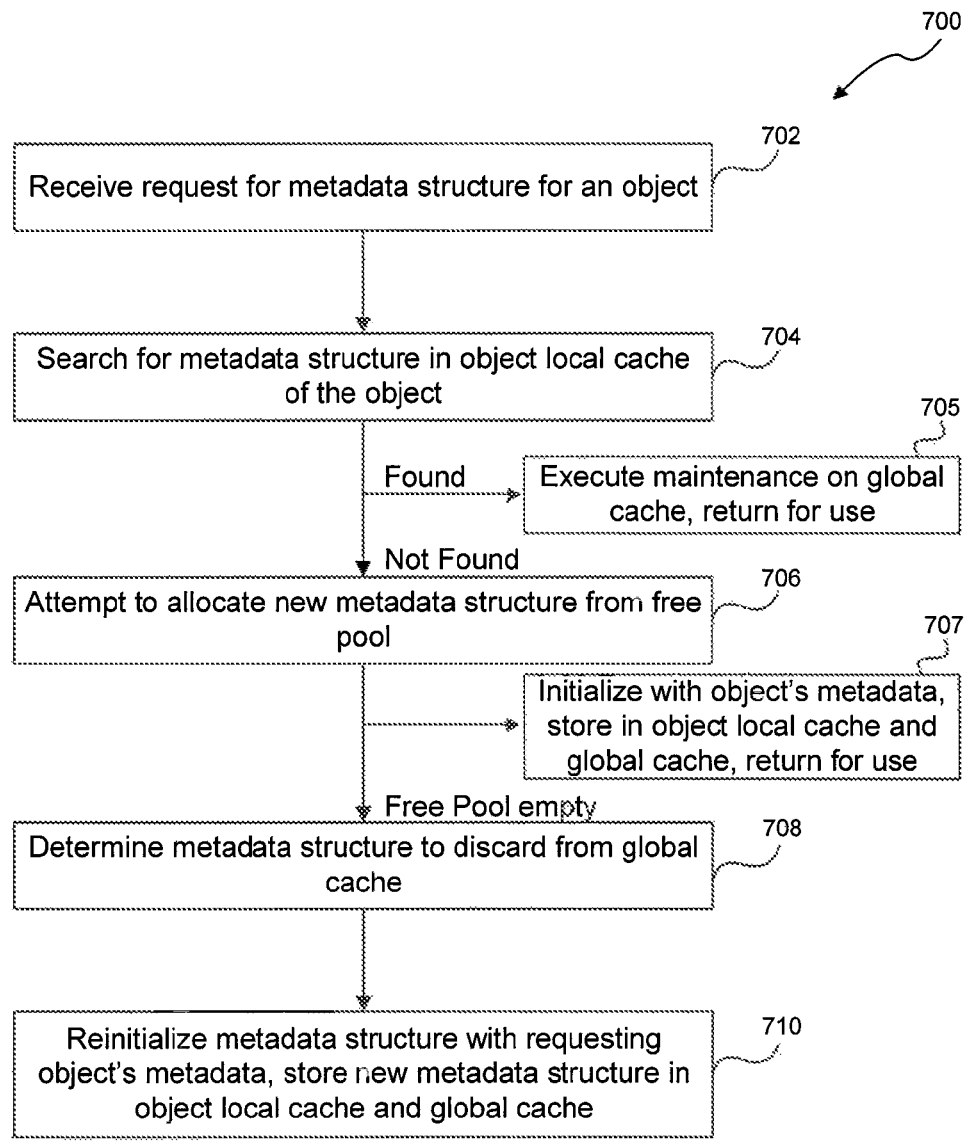
FIG. 7 illustrates a method of searching for a metadata structure in a metadata cache having a plurality of synchronization mechanisms coupled with CAS in a multi-threaded system according to example embodiments.

FIG. 7 is a flowchart of a method 700 for searching for a metadata structure associated with an object in a metadata management system 600 having metadata cache 602 including a global cache 606 and object local caches 610 as well as creation of new metadata if necessary, according to an embodiment. According to example embodiments, the method 700 makes use of a plurality of synchronization mechanisms 604 coupled with CAS 632. Each time a cache is requested or accessed, the cache is to be locked using a synchronization mechanism 604 and protected using CAS 632 as described herein. In step 702, a request for a metadata structure for an object is received by a thread of a processing device. In step 704, the thread of the processing device first searches in a local cache 610 associated with an object by traversing each metadata structure in the local cache 610 and utilizes a metadata structure in the local cache 610 it the thread finds the metadata structure in the local cache 610 (step 705). It found, the metadata management system 600 executes maintenance on the global cache 606 by updating least recently-used/most-recently-used caches n the global cache 606. This found metadata structure is then returned for use. However, it the metadata structure is not available in the local cache 610, in step 706 the thread of the processing device attempts to allocate a new metadata structure from a free pool 608. If this allocation is successful, in step 707, the new metadata structure is initialized with the object's metadata, stored in the local cache 610 and the global cache 606 and returned for use However, if the free pool 608 is empty, in step 708 the thread of the processing device determines a metadata structure to discard from the global cache 606, and discards the metadata structure in the global cache 606. In step 710 the thread of the processing device reinitializes the discarded metadata structure with the requesting object's metadata, and stores the new metadata structure in the local cache 610 and global cache 606.

Figure 8:
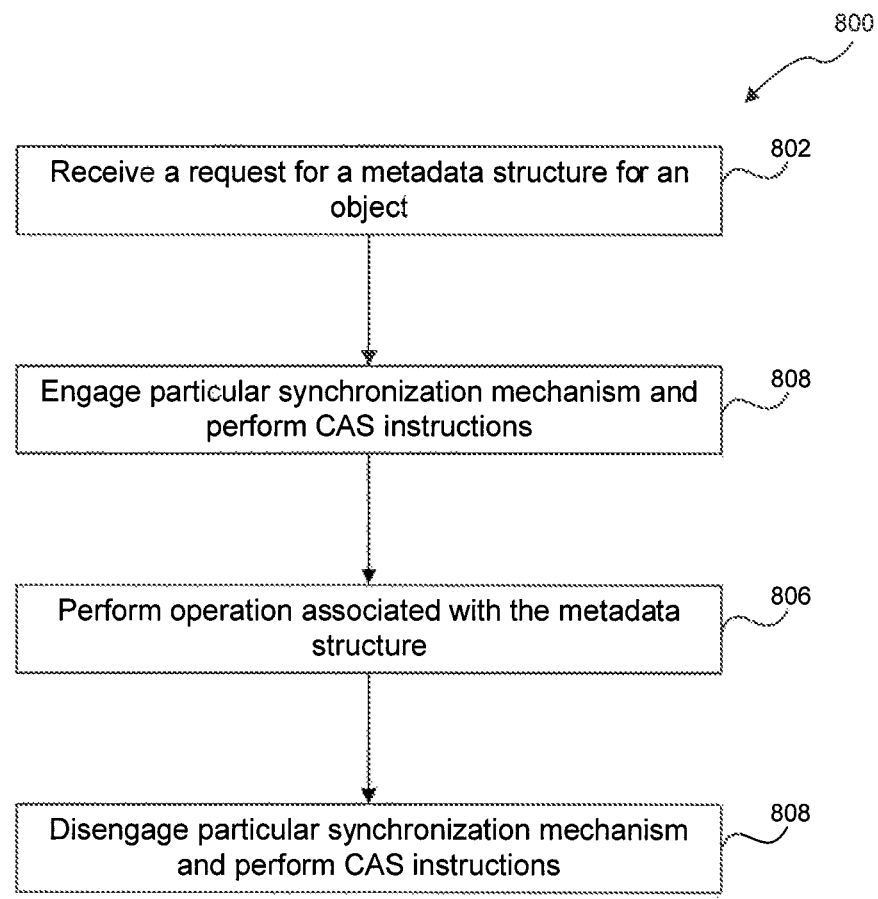
FIG. 8 illustrates a method of engaging and disengaging a particular synchronization mechanism of a plurality of synchronization mechanisms in a metadata cache in a multi-threaded system according to example embodiments.

FIG. 8 is a flowchart of a method 800 for engaging a plurality of synchronization mechanisms 604 coupled with CAS 632 that are associated with a metadata management system 600 having metadata cache 602 including a global cache 606 and object local caches 610, according to an embodiment. In step 802, a request for a metadata structure for an object is received by a thread of a processing device. In step 804, the thread of the processing device engages obtains a particular synchronization mechanism 604 and performs CAS 632 associated with the thread thereby restricting all other threads of the processing device from operating only on the particular cache. According to example embodiments, the CAS 632 may include IS_METADATA_RESERVED, METADATA_HOLD and METADATA_RESERVE. All other threads of the processing device may simultaneously perform operations associated with other available caches. In step 806, the thread of the processing device performs an operation associated with the request for the metadata structure. In step 808, the thread of the processing device disengages the particular synchronization mechanism 604 and performs CAS 632 thereby allowing all threads of the processing device to operate on the particular cache. According to example embodiments, the CAS 632 may include METADATA_UNHOLD and METADATA_UNRESERVE.

FIGS. 9A-D show example pseudocode associated with utilizing a plurality of synchronization mechanisms 604 as well as CAS 632 with a global cache 606 and object local caches 610. FIG. 9A provides example pseudocode for "NewGetMetadata" shown in FIG. 8. FIGS. 9B-D provide example pseudocode for "NewSearchMetadata" shown in FIG. 7.

FIG. 9A shows example pseudocode for a "NewGetMetadata" method according to example embodiments taking "Params" as an input parameter. As noted above, it is desirable to find a metadata structure in an object local cache because this will avoid initialization and instantiation costs for the metadata structure. However, if the object local cache does not have a metadata structure desired then there will be an attempt to allocate from the free pool. However if the free pool is empty then a metadata structure will be selected from the global pool and evicted. The selection will be removed from its current object local cache, reinitialized and inserted into the local cache of the requested object as well as reinserted back into the global cache.

First, the method attempts to find the desired metadata in a local cache. If the metadata is found in a local cache the metadata is returned. However, if the metadata is not in the local cache then the metadata may be allocated using the tree pool. If allocation of metadata in the free pool is successful then the metadata is initialized. The metadata structure is reserved using the CAS METADATA_RESERVE. Next, a particular local synchronization mechanism is acquired and the metadata is inserted in the local cache. The particular synchronization mechanism is deacquired or released. Next, a second global particular synchronization mechanism is acquired, the metadata is inserted into the global cache and the synchronization mechanism is deacquired or released. The metadata structure is then unreserved using the CAS METADATA_UNRESERVE. However, if the free pool is empty then a search of the global cache occurs. Finally, the "NewGetMetadata" returns metadata after the search is completed.

FIGS. 9B-D collectively show example pseudocode for a "NewSearchMetadata" taking a "Cache" (either one of the local caches or global) and "Params" (search criterion) as input parameters. First, a particular synchronization mechanism of the cache being searched is acquired. wait_for_hold, which is described below and in the comments provided in FIG. 9b, is executed. In short, the thread determines whether to wait until a metadata structure is unheld by another thread holding the metadata structure or to skip to a next metadata structure. If the metadata structure is not being held or is no longer being held then it is held using CAS METADATA_HOLD.

If the current metadata is not being held, then it is determined whether the current metadata is reserved. If the metadata structure is reserved by another thread, then the thread executes CAS METADATA_UNHOLD. If the metadata structure is reserved, the current metadata is skipped and the thread moves onto the next metadata structure in the cache being searched.

If the metadata structure is not being held or reserved, the method determines whether the metadata structure matches the search criterion. If the metadata structure does match the search criterion, then the metadata structure is marked for use Thus, the thread has decided to use the current metadata structure so the thread uses the CAS METADATA_RESERVE and then METADATA_UNHOLD. If the search is not taking place in the global cache, then the particular synchronization mechanism is deacquired or released and the metadata has been found in a local cache.

If the search is taking place in the global cache, then the particular synchronization mechanism is deacquired or released. It is not desirable to hold more than a single synchronization mechanism at a single time because this could lead to deadlocks. Next, a second particular synchronization mechanism is acquired. The current metadata structure is removed from cache it is currently found in and the second particular synchronization mechanism is deacquired or released. The current metadata structure is reinitialized and a third particular local synchronization mechanism is acquired. The reinitialized metadata structure is inserted in a local cache corresponding to the object. The third particular local synchronization mechanism is deacquired or released. In other words, a metadata structure was selected to be evicted and reinitialized.

Any post processing regarding the metadata may then occur. For instance, this may include maintaining MRU/LRU lists or statistics regarding the caches. First, a local synchronization mechanism may be acquired, post processing may occur in the local cache and the local synchronization mechanism may be deacquired or released. Then, a global synchronization mechanism may be acquired, post processing may occur in the global cache and the global synchronization mechanism may be deacquired or released. At this point the metadata structure is installed in both a local cache and the global cache. Thus, the metadata structure is unreserved using CAS METADATA_UNRESERVE and returned.

However, if the current metadata structure does not match the search criterion then the metadata structure is unheld using CAS METADATA_UNHOLD. In the event that metadata may not be found using the "NewSearchMetadata," the acquired cache synchronization mechanism is deacquired or released and NULL is returned. This may occur if a search of local cache does not return the desired metadata structure. However as provided above, NULL may not be returned if the search occurs in the global cache because a metadata structure is always selected to be evicted and reinitialized.

Race Conditions

The example embodiments solve problems related to a number of race conditions between concurrent threads acting upon copies of metadata structures located in multiple caches (global and local). As an example, a first thread may acquire a synchronization mechanism for a local cache and then search a local cache for a metadata structure associated with object 1. A second thread may acquire a synchronization mechanism for a global cache and search through the global cache to select an unused metadata structure to evict and reuse for another object. However, the first thread and the second thread may both determine to utilize a same metadata structure. Either the first thread or the second thread should be able to lock the metadata structure for use and the other thread should choose a different metadata structure. This problem is solved by utilizing the META-DATA_HOLD and METADATA_UNHOLD in order to synchronize the activity of both the first thread and the second thread. The thread that first successfully executes METATDATA_HOLD will use the corresponding metadata structure, reserve the metdata structure and execute META-DATA_UNHOLD. The subsequent thread may successfully execute METADATA_HOLD, but not be able to use the metadata structure because the metadata structure is marked as reserved.

As a further example, a first thread may be allocating a metadata structure for object 1 in an object local cache for object 1. A second thread may be allocating a metadata structure for object 2 in an object local cache for object 2. The first thread and the second thread need to update global cache navigation when allocating a metadata structure for a plurality of operations. For example, when a metadata structure is allocated, a thread utilizes an eviction policy to determine a metadata structure to evict. This eviction policy is implemented using the global cache which may be based on a policy such as most recently used (MRU), least recently used (LRU), etc. In addition, the thread updates statistics regarding the metadata structures which may be stored in the global cache. The first thread and the second thread must not serialize these operations on the global cache. Operations on the global cache during allocation of a metadata structure in an object local cache are to be synchronized. This problem is solved by utilizing the global cache synchronization mechanism of both the first thread and the second thread. The global cache synchronization mechanism will ensure that the first thread and the second thread do not perform these operations simultaneously and in the proper order.

As an even further example, a first thread may be installing a new metadata structure in a local and global cache or may be moving a metadata structure from one cache to another cache. A second thread may be searching the global cache to select a metadata structure to evict to be used by another object. The second thread may not be allowed to select the metadata structure that is concurrently being installed by the first thread. This problem is solved by utilizing METADATA_RESERVE, METADATA_UNRESERVE and IS_METADATA_RESERVED in order to synchronize the activities of both the first and the second thread.

As an even further example, a first thread may be searching an object local cache for a metadata structure and place the metadata structure in a HOLD state. A second thread may be searching the global cache to select a metadata structure to evict but find the metadata structure in the HOLD state. The second thread needs to place the metadata structure in the HOLD state but may be unable to because the metadata structure is already in the HOLD state with the first thread. Thus, the second thread is to wait until the metadata structure is unheld by the first thread initiating UNHOLD. Rather than wait, the second thread skips the metadata structure when searching and selects another metadata stricture to evict in the global cache. This problem is solved by using a wait_for_hold method as provided in the example pseudocode as shown in FIG. 9*b*.

wait_for_hold is described further in the comments in the pseudocode provided in FIG. 9B. As provided in the comments, a thread of a processing device executes the wait_for_hold method to determine whether to wait for a hold of a metadata structure to complete. It is better to wait for a hold to complete if the thread of the processing device is searching an object local cache because this may result in avoiding initialization of a new metadata structure. However, it is typically not better to wait for a hold to complete if the thread of the processing device is searching a global cache for unused metadata. Searching the global cache is performed when the metadata structure is not found in an object local cache. While navigating the global cache, a thread may be interested in evicting a metadata structure. Instead of wasting processing cycles waiting for a held metadata structure to become unheld, the thread which is navigating the global cache may decide to skip the metadata structure. The global cache is likely much larger than an object local cache and this search will likely require more time to complete than a search of an object local cache. Thus, if a thread of a processing device is searching an object local cache, wait_for_hold will wait for a hold to complete, but if the thread of the processing device is searching a global cache, wait_for_hold will not wait for a hold to complete.

According to example embodiments, even with multiple synchronization mechanisms, hold and unhold operations, reserve and unreserve operations, the order of execution as provided in the example pseudocode in FIGS. 9A-D may be used to avoid starvation and deadlocks in a multi-threaded system.

Example Computer Implementation

In an example embodiment, the systems, methods and computer products described herein are implemented using well known computers, such as computer 1000 shown in FIG. 10.

Computer 1000 can be any commercially available and well known computer capable of performing the functions described herein, such as computers available from International Business Machines, Apple, Sun, HP, Dell, Compaq, Digital, Cray, etc.

Computer 1000 includes one or more processors (also called central processing units, or CPUs), such as a processor 1006. The processor 1006 is connected to a communication bus 1004. Processors 1006 may include any conventional or special purpose processor, including, but not limited to, digital signal processor (DSP), field programmable gate array (FPGA), and application specific integrated circuit (ASIC).

Computer 1000 includes one or more graphics processing units (also called GPUs), such as GPU 1007. GPU 1007 is a specialized processor that executes instructions and programs selected for complex graphics and mathematical operations in parallel.

Computer 1000 also includes a main or primary memory 1008, such as random access memory (RAM). The primary memory 1008 has stored therein control logic 1028A (computer software), and data.

Computer 1000 also includes one or more secondary storage devices 1010. The secondary storage devices 1010 include, for example, a hard disk drive 1012 and/or a removable storage device or drive 1014, as well as other types of storage devices, such as memory cards and memory sticks. The removable storage, drive 1014 represents a floppy disk drive, a magnetic tape drive, a compact disk drive, an optical storage device, tape backup, etc.

The removable storage drive 1014 interacts with a removable storage unit 1016. The removable storage unit 1016 includes a computer useable or readable storage medium 1024A having stored therein computer software 1028B (control logic) and/or data. Removable storage unit 1016 represents a floppy disk, magnetic tape, compact disk, DVD, optical storage disk, or any other computer data storage device. The removable storage drive 1014 reads from and/or writes to the removable storage unit 1016 in a well-known manner.

Computer 1000 also includes input/output/display devices 1022, such as monitors, keyboards, pointing devices, touch-screen displays, etc.

Computer 1000 further includes a communication or network interface 1018. The network interface 1018 enables the computer 1000 to communicate with remote devices. For example, the network interface 1018 allows computer 1000 to communicate over communication networks or mediums 1024B (representing a form of a computer useable or readable medium), such as LANs, WANs, the Internet, etc. The network interface 1018 may inter face with remote sites or networks via wired or wireless connections.

Control logic 1028C may be transmitted to and from computer 1000 via the communication medium 1024B. More particularly, the computer 1000 may receive and transmit carrier waves (electromagnetic signals) modulated with control logic 1030 via the communication medium 1024B.

Any apparatus or manufacture comprising a computer useable or readable medium having control logic (software) stored therein is referred to herein as a computer program product or program storage device. This includes, but is not limited to, the computer 1000, the main memory 1008, the secondary storage devices 1010, the removable storage unit 1016 and the carrier waves modulated with control logic 1030. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used

CONCLUSION

It is to be appreciated that the Detailed Description section, and not the Summary and Abstract sections, is intended to be used to interpret the claims. The Summary and Abstract sections may set forth one or more, but not all, exemplary embodiments of the invention as contemplated by the inventors, and thus, are not intended to limit the invention and the appended claims in any way.

Embodiments of the invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the invention. Therefore, such adaptations and modifications are intended to be within the meaning and range of equivalents of the disclosed embodiments, based on the teaching and guidance presented herein. It is to be understood that the phraseology or terminology herein is, for the purpose of description and not of limitation, such that the terminology or phraseology of the specification is to be interpreted by the skilled artisan in light of the teachings and guidance.

The breadth and scope of the invention should not be limited by any of the above-described exemplary embodiments, but should be defined only in accordance with the following claims and their equivalents.

What is claimed is:

1. A method, comprising:
   receiving, by a first thread of a processing device, a request for a metadata structure located in a first cache associated with an object;
   accessing, by the first thread of the processing device, the first cache based upon a state of a synchronization mechanism associated with the first cache;
   comparing, by the first thread of the processing device, wherein comparing comprises:
      performing a comparison of the metadata structure to a value associated with the metadata structure, and
      holding, by the first thread of the processing device, the metadata structure associated with the object;
   operating, by the first thread of the processing device, on the metadata structure based upon the comparison of the metadata structure to the value;
   receiving, by a second thread of the processing device, a request for the metadata structure in a second cache associated with the object;
   accessing, by the second thread of the processing device, the second cache based upon a state of a synchronization mechanism associated with the second cache; and
   operating, by the second thread of the processing device, on the metadata structure after the first thread ceases holding the requested metadata structure.

2. The method of claim 1, further comprising:
   reserving, by the first thread of the processing device, the metadata structure associated with the object.

3. The method of claim 1, further comprising:
   unreserving, by the first thread of the processing device, the metadata structure associated with the object.

4. The method of claim 1, further comprising:
   upholding, by the first thread of the processing device, the metadata structure associated with the object.

5. The method of claim 1, wherein the request for the metadata structure in a second cache associated with the object further comprises a request to evict the metadata structure associated with the object.

6. The method of claim 5, further comprising:
   selecting, by the second thread of the processing device, a metadata structure in the second cache not associated with the object to be evicted.

7. The method of claim 6, further comprising:
   allocating, by the second thread of the processing device, a new metadata structure based on memory previously used by the metadata structure in the second cache not associated with the object;

initializing, by the second thread of the processing device, a new metadata structure using the memory previously used by the metadata structure in the second cache not associated with the object;

accessing, by the second thread of the processing device, a third cache based upon a state of a synchronization mechanism associated with the third cache;

storing the new metadata structure in the third cache and releasing the synchronization mechanism associated with the third cache; and accessing, by the second thread of the processing device, the second cache based upon the state of the synchronization mechanism associated with the second cache, storing the new metadata structure in the second cache and releasing the synchronization mechanism associated with the second cache.

8. The method of claim 1, further comprising
accessing, by the first thread of the processing device, a pool based upon a state of a synchronization mechanism associated with the pool;
initializing, by the first thread of the processing device, a new metadata structure in the pool; and
storing the initialized new metadata in the first cache and the second cache.

9. The method of claim 1, further comprising:
traversing, by the first thread of the processing device, a set of metadata structures stored in the first cache to identify a metadata structure associated with the object; and
traversing, by the second thread of the processing device, a set of metadata structures stored in the second cache to identify a metadata structure associated with the object.

10. The method of claim 1, further comprising:
holding, by the second thread of the processing device, the requested metadata structure associated with the object when the first thread ceases holding the requested metadata structure.

11. The method of claim 1, wherein the value associated with the metadata structure comprises a set value of the metadata structure.

12. The method of claim 1, wherein holding, by the first thread of the processing device, the metadata structure associated with the object limits operations performed on the metadata structure to the first thread of the processing device.

13. A system having a multi-threaded processing device sharing a metadata cache, comprising:
a plurality of object local caches configured to store metadata structures;
a global cache configured to store copies of each of the metadata structures;
a first thread of the processing device configured to:
receive a request for a metadata structure located in a first local cache associated with an object;
access the first local cache based upon a state of a synchronization mechanism associated with the first local cache;
compare the metadata structure, wherein comparing the metadata structure comprises:
performing a comparison of the metadata structure to a value associated with the metadata structure, and holding the metadata structure associated with the object; and
operate on the metadata structure based upon the comparison of the metadata structure to the value; and a second thread of the processing device configured to:
receive a request for the metadata structure in the global cache associated with the object;
access the global cache based upon a state of a synchronization mechanism associated with the global cache; and
operate on the metadata structure after the first thread ceases holding the requested metadata structure.

14. The system of claim 13, the first thread of the processing device further configured to reserve the metadata structure associated with the object and located in the first object local cache.

15. The system of claim 13, the first thread of the processing device further configured to unreserve the metadata structure associated with the object and located in the first object local cache.

16. The system of claim 13, the first thread of the processing device further configured to unhold the metadata structure associated with the object and located in the first object local cache.

17. The system of claim 13, wherein the request for the metadata structure associated with the object and located in the global cache further comprises a request to evict the metadata structure associated with the object.

18. The system of claim 17, the second thread of the processing device further configured to select a metadata structure not associated with the object and located in the global cache to be evicted.

19. The system of claim 18, the second thread of the processing device further configured to allocate a new metadata structure based on memory previously used by the metadata structure not associated with the object, initialize a new metadata structure using the memory previously used by the metadata structure not associated with the object, access a second object local cache based upon a state of a synchronization mechanism associated with the second object local cache, store the new metadata structure in the second object local cache and release the synchronization mechanism associated with the second object local cache, and access the second cache based upon the state of the synchronization mechanism associated with the global cache, store the new metadata structure in the global cache and release the synchronization mechanism associated with the global cache.

20. The system having a multi-threaded processing device sharing a metadata cache, of claim 13, further comprising:
a first thread of the processing device further configured to:
traverse a set of metadata structures stored in the first local cache to identify a metadata structure associated with the object; and
a second thread of the processing device further configured to:
traverse a set of metadata structures stored in the global cache to identify a metadata structure associated with the object.

21. The system having a multi-threaded processing device sharing a metadata cache, of claim 13, further comprising:
a second thread of the processing device further configured to:
hold the requested metadata structure associated with the object when the first thread ceases holding the requested metadata structure.

22. The system of claim 13, wherein the value associated with the metadata structure comprises a set value of the metadata structure.

23. The system of claim 13, wherein holding, the metadata structure associated with the object limits operations performed on the metadata structure to the first thread of the processing device.

24. A non-transitory computer-readable medium having instructions stored thereon, the instructions causing at least one computing device to perform operations, the operations comprising:
   receiving, by a first thread of a processing device, a request for a metadata structure located in a first cache associated with an object;
   accessing, by the first thread of the processing device, the first cache based upon a state of a synchronization mechanism associated with the first cache;
   comparing, by the first thread of the processing device, wherein comparing comprises:
      performing a comparison of the metadata structure to a value associated with the metadata structure, and
      holding, by the first thread of the processing device, the metadata structure associated with the object;
   operating, by the first thread of the processing device, on the metadata structure based upon the comparison of the metadata structure to the value;
   receiving, by a second thread of the processing device, a request for the metadata structure in a second cache associated with the object;
   accessing, by the second thread of the processing device, the second cache based upon a state of a synchronization mechanism associated with the second cache; and
   operating, by the second thread of the processing device, on the metadata structure after the first thread ceases holding the requested metadata structure.

25. The non-transitory computer-readable medium of claim 24, wherein the request for the metadata structure in a second cache associated with the object further comprises a request to evict the metadata structure associated with the object.

26. The non-transitory computer-readable medium of claim 25, the operations further comprising:
   selecting, by the second thread of the processing device, a metadata structure in the second cache not associated with the object to be evicted.

27. The non-transitory computer-readable medium of claim 26, the operations further comprising:
   allocating, by the second thread of the processing device, a new metadata structure based on memory previously used by the metadata structure in the second cache not associated with the object;
   initializing, by the second thread of the processing device, a new metadata structure using the memory previously used by the metadata structure in the second cache not associated with the object;
   accessing, by the second thread of the processing device, a third cache based upon a state of a synchronization mechanism associated with the third cache, storing the new metadata structure in the third cache and releasing the synchronization mechanism associated with the third cache; and
   accessing, by the second thread of the processing device, the second cache based upon a state of the synchronization mechanism associated with the second cache, storing the new metadata structure in the second cache and releasing the synchronization mechanism associated with the second cache.

28. The non-transitory computer-readable medium of claim 24, the operations further comprising:
   accessing, by the first thread of the processing device, a pool based upon a state of a synchronization mechanism associated with the pool;
   initializing, by the first thread of the processing device, a new metadata structure in the pool; and
   storing the initialized new metadata in the first cache and the second cache.

29. The non-transitory computer-readable medium of claim 24, the operations further comprising:
   traversing, by the first thread of the processing device, a set of metadata structures stored in the first cache to identify a metadata structure associated with the object; and
   traversing, by the second thread of the processing device, a set of metadata structures stored in the second cache to identify a metadata structure associated with the object.

30. The non-transitory computer-readable medium of claim 24, the operations further comprising:
   holding, by the second thread of the processing device, the requested metadata structure associated with the object when the first thread ceases holding the requested metadata structure.

31. The non-transitory computer-readable medium of claim 24, wherein the value associated with the metadata structure comprises a set value of the metadata structure.

32. The non-transitory computer-readable medium of claim 24, wherein holding, by the first thread of the processing device, the metadata structure associated with the object limits operations performed on the metadata structure to the first thread of the processing device.

* * * * *